United States Patent
Tripathy

(10) Patent No.: US 6,981,274 B2
(45) Date of Patent: Dec. 27, 2005

(54) STORE AND PLAY OF BROADCAST DATA FROM A MULTIPLEX DATA STREAM

(75) Inventor: Aurobindo Tripathy, Milpitas, CA (US)

(73) Assignee: Intel Corporation, Santa Clara, CA (US)

(*) Notice: Subject to any disclaimer, the term of this patent is extended or adjusted under 35 U.S.C. 154(b) by 1022 days.

(21) Appl. No.: 09/823,826

(22) Filed: Mar. 30, 2001

(65) Prior Publication Data

US 2002/0141431 A1 Oct. 3, 2002

(51) Int. Cl.$^7$ .......................................... H04N 7/173
(52) U.S. Cl. ........................... 725/93; 725/92; 725/95
(58) Field of Search .............................. 725/37, 39, 92, 725/93, 95; 370/464, 465, 477, 536, 542; 348/461, 478; 709/217, 231

(56) References Cited

U.S. PATENT DOCUMENTS

| | | | |
|---|---|---|---|
| 5,832,085 A | * | 11/1998 | Inoue et al. ................. 386/124 |
| 5,898,695 A | * | 4/1999 | Fujii et al. .................. 370/464 |
| 6,404,711 B1 | * | 6/2002 | Kato ........................ 369/47.31 |
| 6,728,271 B1 | * | 4/2004 | Kawamura et al. ......... 370/536 |
| 6,788,710 B1 | * | 9/2004 | Knutson et al. ............ 370/535 |

* cited by examiner

Primary Examiner—Kieu-Oanh Bui
(74) Attorney, Agent, or Firm—Blakely, Sokoloff, Taylor & Zafman LLP

(57) ABSTRACT

The present invention provides for selectively storing broadcast data from a multiplex data stream required for later play, while also maintaining synchronicity of the broadcast. A processing system may be employed to process and store particular channel packets and associated packets for a channel. Packets are stored with a time stamp that is compared to a ready time when the channel data is to be played. The channel data from each sequential packet is transferred to a player device at the appropriate time. The system may temporarily pause the transfer of data when it is not yet time to play the next packet. In addition, other aspects of the present invention relating to the processing system storing and manipulating broadcast data are described.

15 Claims, 6 Drawing Sheets

STORE AND PLAY OF BROADCAST DATA FROM A MULTIPLEX DATA STREAM

FIELD OF THE INVENTION

The present invention relates generally to the pause and play of broadcast data. In particular, this invention is related to the processing and storage of channel data, which may be later played.

BACKGROUND

Computing power and acceptance of digital transmissions are being designed into a wide range of business and consumer devices. For example, certain player devices, e.g. analog television, may be transformed into a user interface for Internet access. Central to digital broadcasting is a broadcast system, such as a set-top box, that receives and processes signals to enable a player device. A broadcast processing system may receive content from a digital transmitter through a variety of sources, such as local video, cable and satellite channels. The digital transmitter prepares content for sending to the recipient broadcast system.

The digital transmitter creates a continuous bit stream, i.e. transport stream, of audio, video and/or associated data for multiple channels. FIG. 1 depicts a common process for preparing a transport stream that may be performed by a digital transmitter. Audio and video data are received 2 and separately encoded to form respectively audio and video elementary streams 4. Current digital broadcasting environments employ the MPEG-2 (Motion Picture Experts Group 2, ISO (International Standards Organization) Standards 13818, Parts 1, 2, and 3 (November 1994)) file format as the typical compression scheme, but future technology may involve other compression formats.

The streams are formed into packets 6, each of which has a packet header followed by data. A multiplexer combines the elementary stream packets from various encoders together with any security and associated data, e.g. program specific information (PSI), into digital transport stream packets 8. The resulting transport stream is a multiplex of data from numerous channels with a header of information required by a decoder to decompress the packet structures and information indicative of the type of payload in the packet.

The PSI is associated data that is useful or necessary for the ultimate de-multiplexing of a transport stream, i.e. separating the transport stream components, and for the successful regeneration of programs. One type of PSI is a program association table (PAT) that specifies information to translate broadcast codes into the appropriate channel number. The PAT also provides correspondence between program number, i.e. identifier associated with a program, and each packet in a transport stream that carries a program definition. A program definition is a mapping between a program number and the elementary streams that comprise it. A program map table (PMT) is also a PSI that provides for management of all of the PSI tables and carries all of the program definitions for a transport stream. The PMT specifies which elementary streams are associated to form each program by referencing packet identifiers (PID's) for each program number. Another PSI, a conditional access table (CAT), provides encryption keys for the packets that the receiving broadcast system is authorized to play. Encryption for conditional access to programs may be encoded in elementary streams of a transport stream. A network information table (NIT) is an optional PSI for private and predefined content.

The transport stream is sent by the digital transmitter 10 and received by a broadcast processing system, e.g. set-top box. Some sophisticated processing systems permit storing of recorded television broadcasts. However, in general, storing of broadcast data is problematic because it consumes an enormous amount of space in storage.

Processing systems that retain channel data for later playing require the complete transport stream be stored in multiplex form. Thus, not only is data that is relevant to a desired channel kept, but also unwanted data for other channels that are in the multiplexed transport channel are stored. This extra data pointlessly consumes space that is bettered suited for the data that is in fact used for a channel of interest.

The large volumes of stored data in these systems result in a higher bit rate for the system. An exemplary transport stream carries all data for 10 to 12 channels and just one frame of video may result in 3000 to 4000 packets. Thus, these systems store at least ten times the required volume where only a single channel data is wanted. Furthermore, the transport stream is typically pushed into storage at the same high rate in which it enters into the broadcast system, e.g. 45 mbps. The high bit rate tends to cause greater wear on the drive. Moreover, the high capacity drives that are required to handle the heavy load are usually expensive.

In general, the shortcomings of the currently available methods for storing data are inadequate for playing select channel data, at a later time. In particular, previous methods require storing of more data than is required for play.

BRIEF DESCRIPTION OF THE DRAWINGS

The present invention is illustrated by way of example, and not limitation, in the figures of the accompanying drawings in which.

DETAILED DESCRIPTION

The present invention provides for separating of specific broadcast data related to a channel from a multiplex data stream and storing the data for later play. The system tracks the order and timing of selected packets in an incoming transport stream that has compressed packets for multiple channels. Selected channel packets with channel data for a particular channel segment (a program, partial program or more than one programs of a channel over a given period of time) are separated from other channel packets in the multiplexed stream and stored along with a time stamp. In addition, associated packets that are related to the data packets may be stored. These associated packets contain associated data that are either useful or necessary for regeneration of the channel stream during play.

When the channel data for the particular channel segment is to be played by a player device, the packets, i.e. channel packets and all associated packets, are retrieved from storage. The time stamp for each sequential channel packet is compared to a ready time to determine whether the next packet in the stream is ripe to be played. The channel data from a packet is transferred to the player device at the appropriate time. If the time stamp of a next packet in line does not equal a ready time, the time remaining may be determined and the firing of the channel data is paused for that amount of time. In this manner, only necessary packets need to be stored and synchronicity is maintained to recreate the selected channel program(s).

Figure 1:
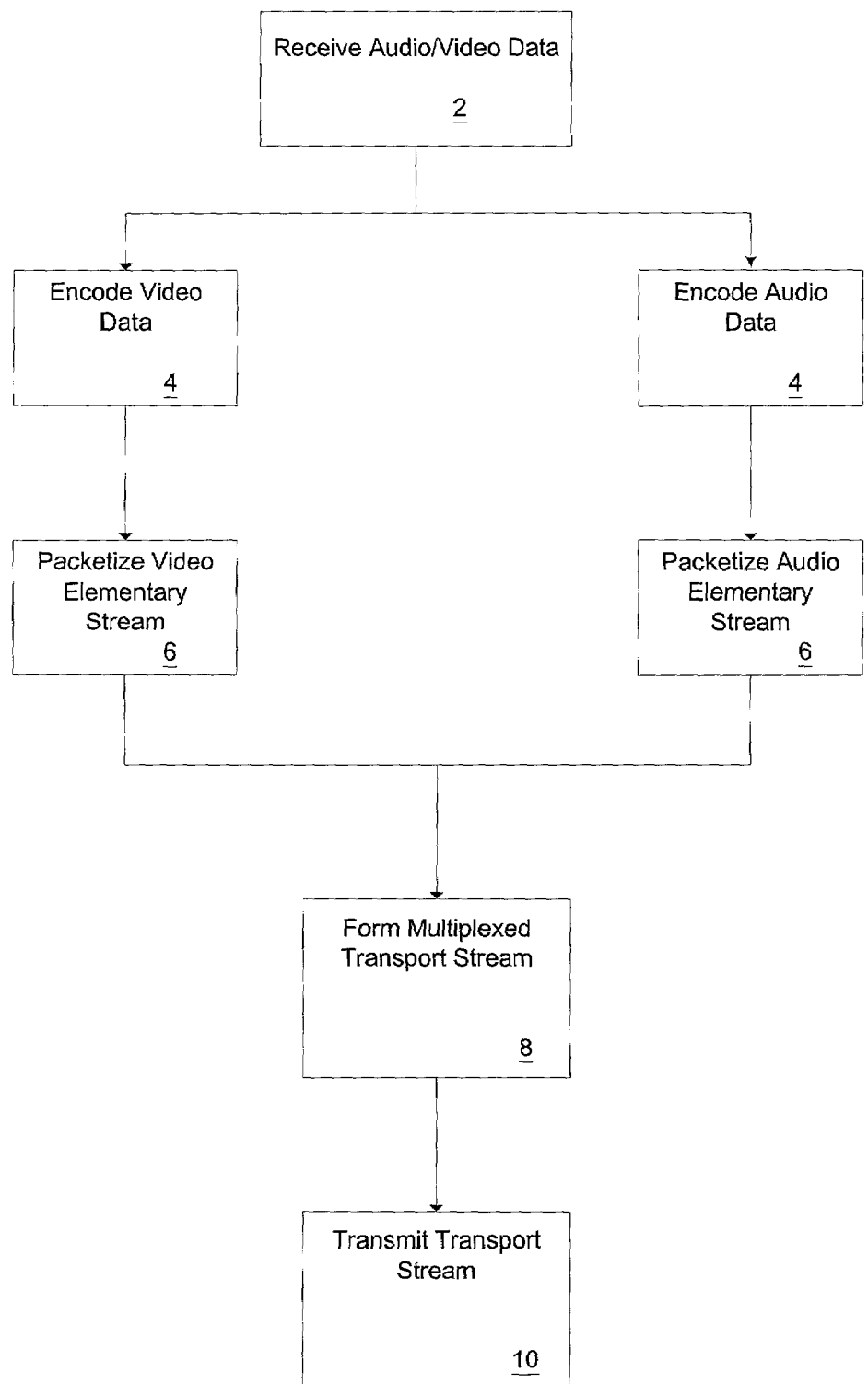
FIG. 1 is a block diagram showing a currently typical process used by a broadcasting transmitter to prepare a transport stream for broadcasting to a processing system.
Figure 2:
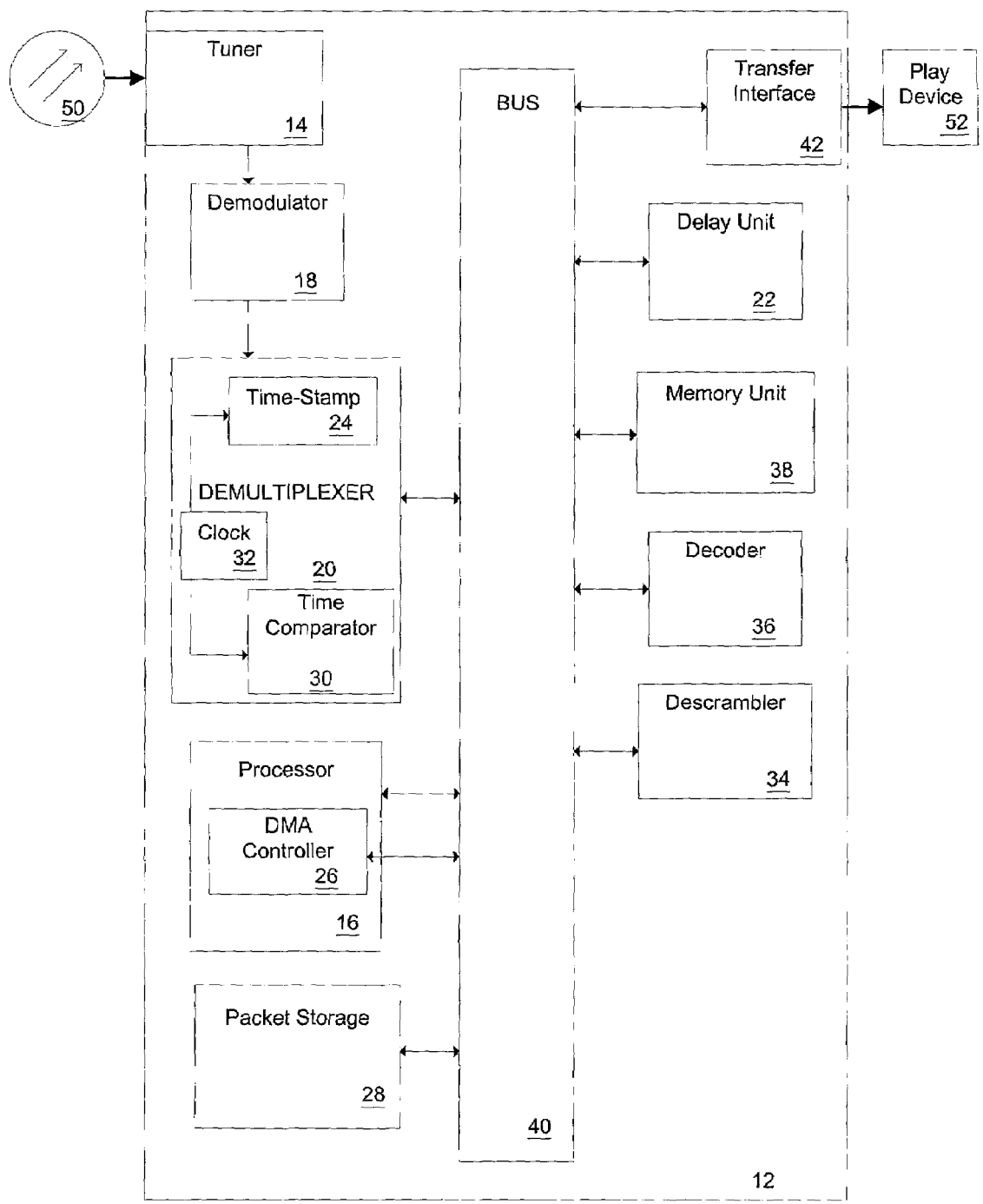
FIG. 2 is a block diagram illustrating a broadcast environment having one embodiment of processing system in which broadcast signals may be processed and stored in accordance with the teachings presented herein.

FIG. 2 illustrates an exemplary embodiment of broadcast processing environment in which broadcast signals are manipulated, stored and transferred by a broadcast processing system 12, according to one embodiment of the present invention. The processing system 12 is in communication with a broadcast network 50, such as cable, satellite, terrestrial network, or the like. The processing system 12 receives broadcast data from the network. After the processing system 12 has handled the broadcast signals, the resulting broadcast data is in a form acceptable for playing and the data may be transferred to a player device 52 for presentation to a user. The player device 52 is any device capable of presenting the data for a user to experience, e.g. a display monitor, a television, a speaker, other conventional output device, future-developed output device, or combinations thereof. The player device may be external to the processing system or an integrated component of the processing system.

The processing system may be any electronic device that receives broadcast data, e.g. audio and/or video data, stores and processes the data and communicates with a player device. A typical processing system is a digital set-top box. But the system may also be another telecommunication device, e.g. digital cellular telephone, personal digital assistant, pager, digital camera, other wireless device that may be used to stream video over the Internet, etc. Still other processing systems include a variety of computer systems, e.g. desktop computers, laptop computers, etc. These processing systems are presented by way of example and are not intended to limit the choices of devices for storing and processing data according to the teachings herein, which currently exist or may be available in the future.

In general, the processing system 12 according to the present invention includes a demultiplexer 20 for selecting and separating packets for a particular channel from a multiplexed transport stream, a time stamp unit 24 for attaching a time stamp to the packets, and a packet storage unit 26 for storing the packets. For regenerating the data stream from the particular channel, a time comparator unit 30 is provided to check the time stamp against the time of a clock 32 to permit playing of data at the appropriate time and sequence. Transfer interface 40 transfers the so processed data for play.

A demultiplexer 20 receives the binary signal to extract audio, video and data packets from the binary stream. The demultiplexer 20 examines the PID's for identifying various data formats, e.g. audio, video, or interactive services. The demultiplexer 20 selects and filters out particular packets, including channel packets and associated packets for a particular channel. The demultiplexer 20 is a chip, and usually in the form of an application-specific integrated circuit (ASIC) chipset.

In one embodiment, as shown, the time-stamp unit 24, time comparator unit 30 and clock 32 are subcomponents of the demultiplexer 20. However, in other embodiments one or more of these time-related units may also be separate from the demultiplexer and communicate through bus 40. The time stamp unit 24 and time comparator unit 30 also may communicate with clock 32.

The time stamp unit 24 is provided to attach a time stamp, i.e. a tag, to each packet in the sequence that the packet enters the processing system, so that the packet may be assembled back into the right sequence and presented at the right time. In one embodiment, the time stamp unit 24 attaches a time stamp to every packet of a particular channel over a select period of time. In another format, the time stamp unit 24 only tags packets having channel data for the given channel. This time stamp is a bit representation of time and date information, e.g. year, day, month, hour, minute, second, etc. The time stamp is loaded into the time stamp unit 24 from signals provided by a network time clock, which may be the clock 32 (as shown) or other clock that has a network time, i.e. generally-accepted network time values for a given network.

The time stamp represents the instant that the packet is received by the processing system and is recognized by the time stamp unit. The time stamp is finely set with great accuracy to greater than one second and usually at least a microsecond, depending on the real time clock accuracy. For example, the clock often runs at about 20 megahertz (MHz), e.g. 27 MHz, to several hundred MHz. The time stamp is a relatively small number of bits, and usually about 30 to 45 bits. The packet along with its corresponding time stamp may be stored until it is ready to be played.

The processing system 12 has a packet storage unit 28 to hold the packets, which may be any magnetic, optical, magneto-optical, tape, and/or other type of machine-readable medium or device for writing and storing information. For example, the packet storage unit 28 may be a writeable optical compact disc (e.g. CD ROM, DVD), a disc, tape, random access memory (RAM), such as dynamic RAM (DRAM) and static Ram (SRAM), etc. These storage systems described are by way of example and are not intended to limit the choice of storage that are or may become available in the data storage field, as described herein. In one embodiment, the processing system 12 also has a temporary storage unit (not shown) to momentarily store the packets prior to the packet storage unit 28 obtaining the packets. In another embodiment, the packet storage unit 28 is the same as or similar to the memory unit 38, that is described below.

The clock 32 and time comparator unit 30 operate to determine when the packets are to be moved out of the packet storage unit 28. Clock 32 establishes a value useful in comparing a time stamp for a packet to a ready time in determining if it is time to play the channel data in that packet. The clock is referenced at the time that a channel segment is to be played, i.e. play time. A real time clock may be employed to indicate to the clock 32 the network time or the clock 32 may keep network time without the use of a separate real time clock. in one embodiment, when the network time reaches the play time, the clock is set to the value of the time stamp of the first packet in the stream for a selected channel segment. This first packet in the stream may be a channel packet, an associated packet, or the like. After this initialization, the clock continues to run. In other embodiments, the clock is not initialized but maintains its operation at network time.

A time comparator 30 reads the time stamp for the next data packet in the data stream order. The order of the arriving packets is usually maintained while the packets are in storage by the processing system. A comparison yields a determination of whether the next packet in the stream is ready to be played.

The time comparator 30 assesses whether a time stamp is equal to a ready time. The ready time is based on the time stamp of a first packet and the time of clock 32.

In some embodiments, such as where the clock is initialized to the first packet time stamp, the ready time is the current clock time of the clock as initialized and continued to run, at the point when the clock time is considered for each sequential packet. Thus, the time comparator 30 indicates if a time stamp equals the clock time. To illustrate, if a play time is established at 9:00 pm/Mar. 28, 2001, for a segment on channel 2 and the time stamp of the first packet entering the system with channel data for channel 2 is 7:00 pm/Mar. 28, 2001, then at 9:00 pm/Mar. 28, 2001 (play time) the clock is set to 7:00 pm/Mar. 28, 2001 (first packet stamp time). The time comparator 30 recognizes when each packet's time stamp equals the ready time (in this case, the current time of the clock).

In other embodiments where the clock is not initialized, such as to match the first packet stamp time, the time comparator may calculate the difference between clock time (i.e. network time) and the first time stamp value as a basis from which to determine the ready time for each packet. Each ready time for a packet may be ascertained by various calculations that reconcile the clock time and time stamp value. For example, the difference between network time and first packet stamp time may be determined and added to each packet time stamp. Another method is by subtracting the network time by the difference between clock time and first packet stamp time. To illustrate, referring to the parameters described in the above example, the system determines the difference between play time of 9:00 pm/Mar. 28, 2001 and first packet time stamp of 7:00 pm/Mar. 28, 2001 to be 2 hours/no days. The time comparator may determine the ready time by adding 2 hours/no days to each packet time stamp or by subtracting the current network time by 2 hours/no days, or other similar calculation. The time comparator recognizes when the time stamp equals the ready time.

A transport interface 42 is in communicative relationship with a player device 52. The transport interface may be a suitable connection port for a variety of communication pathways, such as hardwire, wireless, optical, satellite, other communication link to the player device, or combinations thereof. Furthermore, where a player device is integrated with the processing system, the transport interface may be merely the point of transfer to the player device.

In addition, the processing system according to the present invention may have other various components that assist in treating of broadcast signals as shown in FIG. 2. Bus 40 is usually provided to carry information between system components. The width of the bus determines how much data can be sent between components, such as 8-bit, 16 bit 32 bit, 64 bit (e.g. Peripheral Component Interconnect (PCI) bus), etc.

The processing system 12 may have a tuner 14, which may be one of a variety of types of tuners that receive broadcast signals from the digital network. Some types of tuners include broadcast in-band (IB), out-of-band (OOB) and return path tuners. The IB tuner isolates a single channel (baseband) from multiple channels (broadband signal). An OOB tuner transfers data between a head-end system and the processing system 10. A return path tuner may send data back to the interactive services provider. The tuner may be connected directly to a demodulator 18 (as shown) or to a bus 40.

The system may optionally have a demodulator 18 to convert analog signals to digital bit streams having video, audio and/or data. The demodulator also may check for errors in the bits. The demodulator is usually a silicon chip. Optionally, where information is to be sent back to through the network, such as to a service provider, a modulator (not shown) may also be included in the system 12 and the tuner may be a return path tuner. The demodulator 18 may be directly coupled to the demultiplexer 20 (as shown) to transfer the packet information or coupled to bus 40.

A processor 16, such as a microprocessor, i.e. central processing unit (CPU) performs various central tasks, such as initializing components; processing Internet; interactive television and other applications; monitors and manages hardware interrupts; fetches data and instructions from memory and runs various programs. The processor usually contains an arithmetic-logic unit, control unit and a clock to regulate processor speed and synchronize system components.

Direct memory access (DMA) controller 26 controls data transfer into and out of the various storage areas, e.g. packet storage unit. The DMA controller 26 connects one or more units directly to the storage. The DMA controller may be a separate part of the processor (as shown) or an independent unit but coupled to the processor. Employment of the dedicated DMA controller 26 avoids use of the processor to transfer and retrieve data and to issue storage commands. The DMA controller 26 may include a program for moving a stream of data between system units and storage, thereby not requiring access to an instruction in memory and needing executing those instructions one-by-one. In this manner, the DMA controller may obtain high performance block transfers, useful for the high speeds associated with broadcast data displays.

Often, the DMA and system processor operate at the same time. However, in some instances the DMA activity may create contention, such as where the DMA controller and a processor share a signal wire, e.g. bus, to memory. In such a case, a mechanism may be employed to arbitrate the unit that shall have access to memory when both attempt to gain such access at the same time.

In situations where DMA controller 26 and processor 16 do not operate in unison, the DMA controller may synchronize with an idle period of the processor to access packet storage unit 28. The DMA controller may force an immediate disabling of the processor with an interrupt service routine. Such interrupt process provides for priority of the DMA controller and ensures that the transfer will occur, despite other demands placed on the processor. Alternative procedures that permit a controller access include the DMA requesting a halt of the processor and awaiting an acknowledgement from the processor, the DMA timing memory access to a clock interval or status signal of the processor that signals an idle cycle, or other such procedures. After the DMA performs a transfer, the processor resumes its normal activity.

In the event that the DMA controller 26 and processor 16 operates simultaneously, the DMA controller 26 may function with an interrupt procedure to indicate to the processor the DMA controller operations and/or progress. For example, the DMA controller may initiate an interrupt procedure prior to removing data from storage as an initialization of such a data relocation process. Furthermore, the DMA controller may use an interrupt procedure after removing all packets of interest from storage to signal to the processor that the transfers are complete.

The processing system 12 usually has a delay unit 22 to control the transfer of the next channel packet where the next channel packet is not ready to be played. If the time stamp of a next sequential packet does not equal the ready time, then it is not yet time for the data packet to be played and the process is paused. In one embodiment, the pause is by delaying the removal of the next packet from storage for preparation of transfer. Thus, the next packet temporarily remains in the packet storage or a temporary storage until it is time for the contents to be played. As a result of the pause, the program resulting from the transferred data stream may be played at a substantially similar or same rate as the original program entering the processing system.

A descrambler unit 34 may be provided to decrypt the data in the packets. In some cases, where the data is to be immediately played rather than being played later, the packets may be sent from the demultiplexer to an appropriate descrambler unit 34 and then to a decoder 36. However, the processing system 12 according to the present invention permits the packets to be further processed and stored for playing at a later time. Usually, the packets are stored in scrambled form with the required decryption information, e.g. CAT. However, in some embodiments, the packets are decrypted by the descrambler unit prior to storage.

The descrambler 34 may also work with security subsystems, which may be encompassed in the associated packets to determine access rights to various Internet and digital television services. The descrambler unit 34 is based on an algorithm that prevents unauthorized users from viewing programs or accessing Internet-based services. The decryption process is usually operator-specific. However, some countries have defined a common scrambling standard.

Decoder 36 receives the signal to transform the digital bits into a format suitable for presentation on the player device, e.g. MPEG-2 decompression. Often the decoder 36 is comprised of several different decoder units, such as video, audio and data decoder for specific packet types. The video decoder converts video packets into a sequence of pictures that are shown on a display on the player device 52 and according to the screen resolution of the display. The video decoder may also support a still picture, which is a video sequence containing exactly one picture. An audio decoder decompresses audio packets and may present the bit stream to an output device, e.g. speakers. The associated data decoder interprets tables and presents the data to an external device or sends it to the system processor.

Memory unit 38 may be one or a collection of various types of memory used. Often a non-volatile storage, e.g. electrically erasable program read only memory (EEPROM), Flash memory, or cache, is provided for the operating system and resident software applications. The memory unit 38 may also be a hard drive, either integrated within the system, or external and coupled to the system. The hard drive permits high capacity storage of data, such as digital movie programs. The memory unit 38, alternatively, may be another magnetic disk, a magneto-optical disk or other read/write device. The processor may also be coupled to other types of multiple storage areas that may be considered as part of the memory unit 38 or separate from the memory unit 38. In some embodiments, the memory unit 38 is the same as the packet storage unit 28.

Other optional components related to the play of broadcast data may be provided in a processing system 12. For example, a graphics processor may be present to render Internet file formats and other file formats. In one application, a resulting graphics file may be used to overlay with standard video. A plethora of additional components may be connected to the processing system 12 by various interfaces, such as modems, high-speed multimedia interfaces, RS232, common interface, VCR interfaces, smart card readers, remote controls, IR blasters, wireless keyboards, and other elements that enhance the processing and storing of data according to the present invention.

The methods of processing and storing particular data commence when the processing system receives channel data that is to be played at a later time. Instructions to later play the data may originate through a user command, a predefined schedule, an internal or external trigger event, etc. Usually, the processing system receives instructions either in advance of receiving the relevant data or as the data enters into the system.

Figure 3:
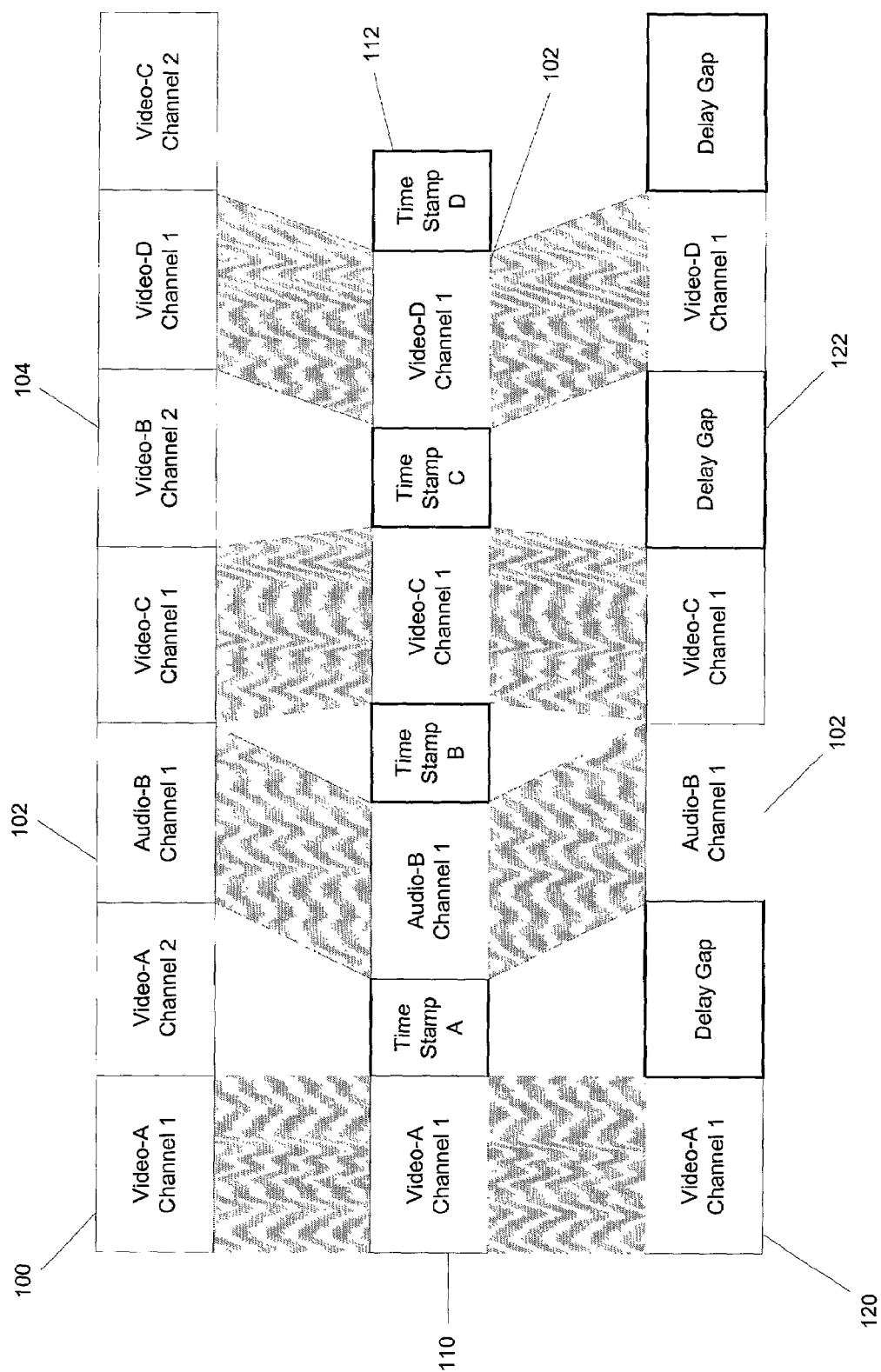
FIG. 3 is a block diagram example of a broadcast data stream in various stages of processing: as received by a processing system, as stored, and as processed for transfer and play, in accordance with the teachings presented herein.

FIG. 3 illustrates one example of a broadcast channel data stream at the various stages of handling by the processing system. A transport stream 100 that enters the processing system is represented having intermixed video packets and audio packets for channel (1) 102 and video packets for a channel (2) 104. The transport stream 100 is not yet manipulated by the processing system.

A stored data stream 110 has been prepared for storage by the processing system. The processing system has demultiplexed the transport stream into channel packets 102 for selected channel (1). The stored data stream 110 is retained in a packet storage unit in the processing system along with any associated packets. Each packet of the stored data stream has time stamps 112 attached thereto.

A data stream 120 as transferred for play comprises packets of the stored data stream 110 and has been further processed for play. The played data stream 120 has the channel packets 102 for the selected channel (1) in the sequence that the data stream will be transferred and presented by a player device. The transferred data stream also has delay gaps 122 representing pauses in the transfer process, which is inserted to permit regeneration of the data stream as it would have appeared had the processing system transferred the data stream immediately upon receipt rather than storing the data packets.

Figure 4:
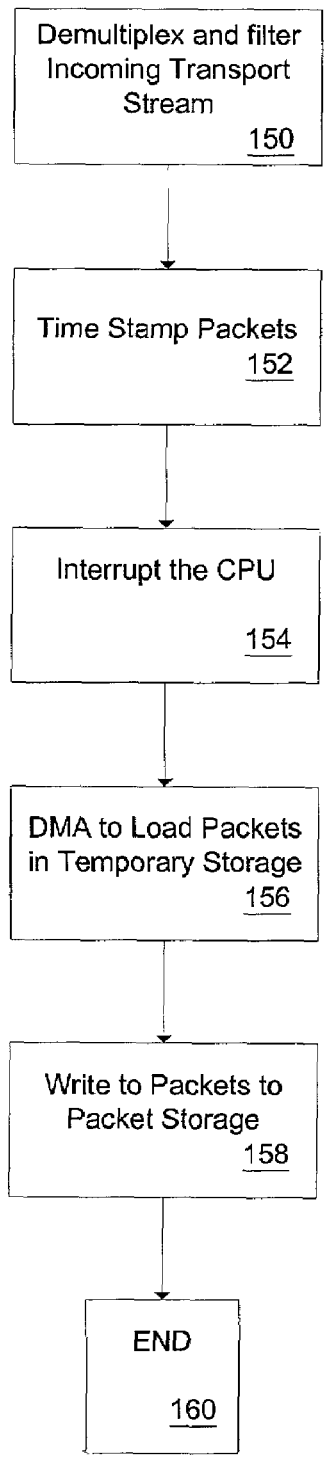
FIG. 4 is a flow chart depicting one method for storing broadcast data in accordance with the teachings presented herein.

One embodiment of the storage process according to the present invention is shown in FIG. 4. The multiplex transport stream is de-multiplexed to separate channel packets and associated packets for a channel segment 150. The packets that are related to the channel data of interest are identified and filtered out by reference to the PID of each packet. The system may recognize the appropriate PID values for a selected channel by use of information in an associated packet, such as a PAT.

A time stamp is attached to each filtered packet in the sequence that the given packet is received by the demultiplexer or the time comparator. The stamped packets are placed into a packet storage unit. Often, the packets are moved into storage through a DMA procedure 156. In one method, the DMA procedure is with an interrupt to the normal operation of the system processor 154. Since packets should be stored as soon as they arrive, the system can use an interrupt procedure to immediately store the packets and not wait for the processor to become idle. Oftentimes, the packets are sent to a temporary storage 156 prior to writing into the packet storage 158. When the DMA procedure is complete the procedure ends 160.

The stored packets consist of channel packets having data for one or more programs that may be played for a channel. The stored packets also usually include at least one type of associated packets, e.g. PAT, PMT, CAT, NIT, which are desired or required for data reconstruction. In one embodiment, the PAT and/or PMT are not needed to be stored because the channel data is related to an identified channel segment.

The packets remain in the storage unit until the channel data of the first packet is to be played, at which time the packets are sequentially retrieved from storage. Often the play time is pre-set by instructions, such as a schedule defined by a user, in the same instructions that activated storage of the data. The packets may also be retrieved according to a user command to play selected channel data at any given moment, i.e. immediately.

Figure 5:
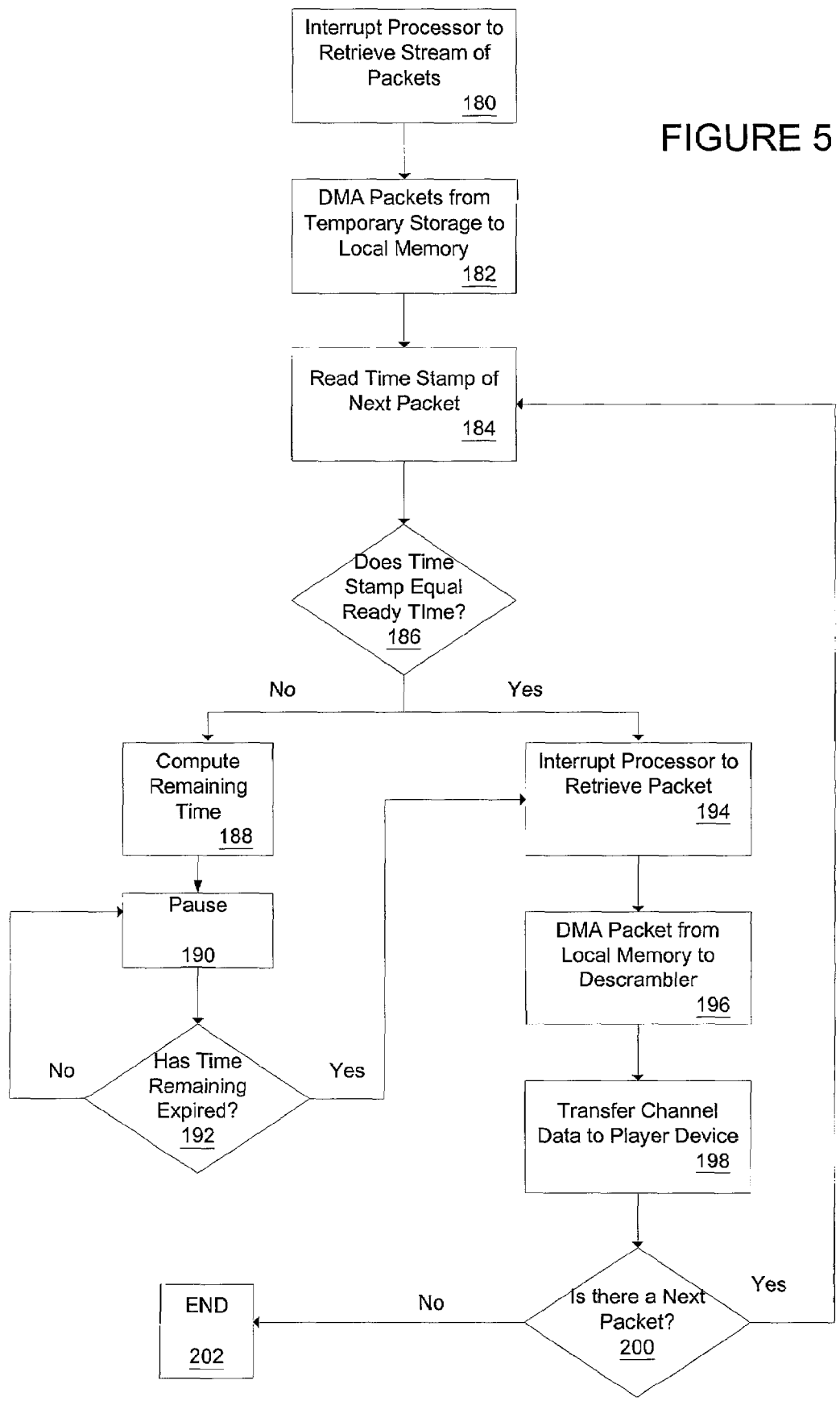
FIG. 5 is a flow chart depicting one method for processing stored broadcast data for play, in accordance with the teachings presented herein.

FIG. 5 is a flow chart showing an exemplary process to remove packets from storage and prepare data for play. The retrieval of a stream of packets may be through an interrupt of the system processor 180 and DMA of packets from the packet storage unit to the local memory 182, e.g. demultiplexer memory, as described above for packet storage. However, retrieval may also be through the system processor without employing a DMA controller and not with an interrupt procedure.

The processing system regenerates the channel data by transporting the correct order of packets to a player device at the required time and fills in gaps in timing with delays. To provide for "lip synch" in the final program, audio and video should be synchronized within a few tens of milliseconds or less.

For each data stream, the time stamp of the next sequential packet in the stream of packets is read 184 and compared to the clock time to determine if the time stamp equals the ready time 186. Where the time stamp is not the same as the ready time, the time remaining between the ready time and the time stamp for that packet is computed 188. The system pauses the transfer of channel data, usually by delaying when the next packet is pulled from the demultiplexer 190 until the remaining time expires 192, or else the system continues to pause 188.

Where the time stamp is the same as the ready time, and/or the remaining time expires, the packet is moved from local memory in the demultiplexer to a descrambler. It is important that the packet is immediately shifted from the memory unit. The packet is usually pulled from memory by a DMA process 196 and may be with an interrupt of the system processor 194, as described above.

The packets are decrypted by the descrambler according to stored descrambling keys and the associated data, e.g. CAT information. Only the packets that are permitted for play have keys provided in the associated CAT. For example, where a user subscribes to Home Box Office (HBO), keys are provided for channel packets related HBO. Where a key is not provided for a packet, the packet is discarded.

The channel data is decoded to a format that is acceptable for the player device. The decoded channel data is conveyed to the player device for presentation to a user 198. Then the next packet is inspected 200, or if there are no more packets, the process ends 202. In one embodiment, prior to ending, a DMA controller initiates an interrupt procedure to indicate to the processor that all packets for the data to be played have been removed from storage.

Figure 6:
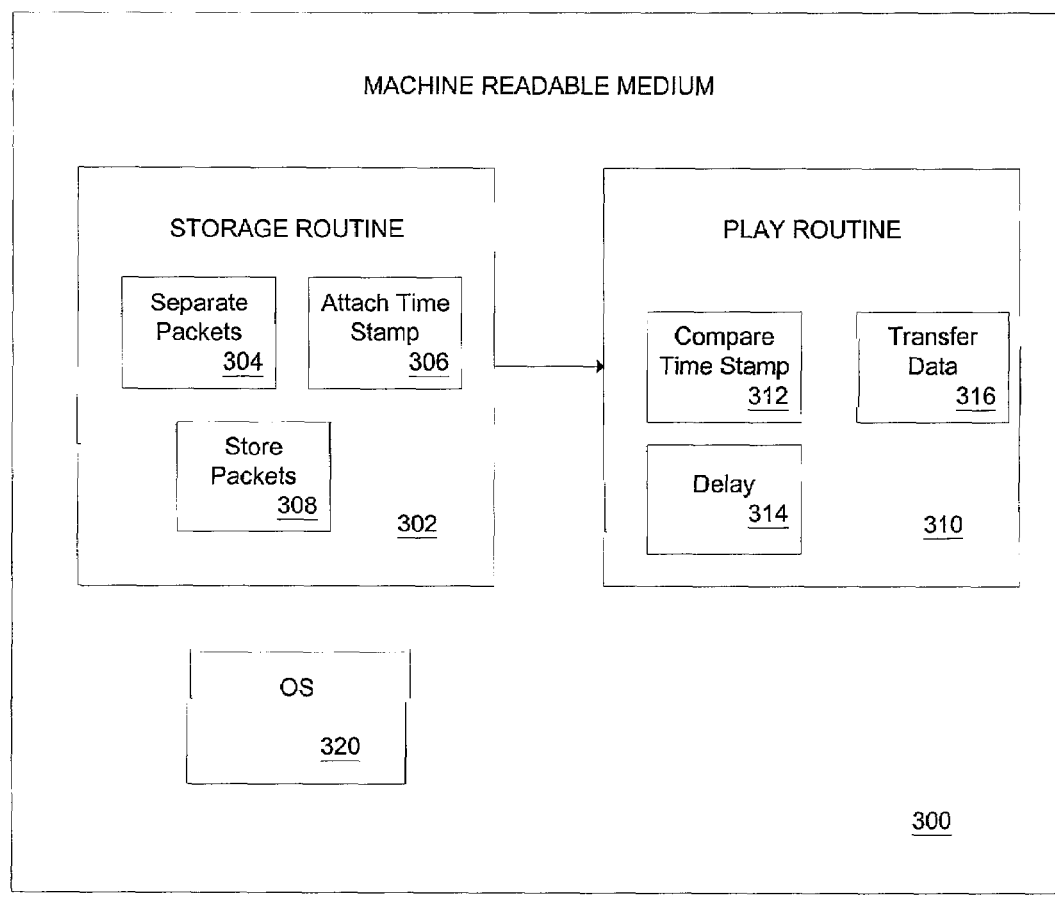
FIG. 6 is a block diagram of a machine-readable medium storing executable code and/or other data to provide one or a combination of mechanisms to store and process for play broadcast data, in accordance with one embodiment of the present invention.

Various software components, e.g. applications programs, may be provided within or in communication with the broadcast processing system that cause the processor or other components of the device to execute the numerous methods employed in updating a stored file in a reliable manner. FIG. 6 is a block diagram of a machine-readable medium storing executable code and/or other data to provide one or a combination of mechanisms for processing and storing broadcast data, according to one embodiment of the invention.

The machine-readable storage medium 300 represents one or a combination of various types of media/devices for storing machine-readable data, which may include machine-executable code or routines. As such, the machine-readable storage medium 300 could include, but is not limited to one or a combination of a magnetic storage space, magneto-optical storage, tape, optical storage, battery backed dynamic random access memory, battery backed static RAM, flash memory, etc. Various subroutines may also be provided. These subroutines may be parts of main routines in the form of static libraries, dynamic libraries, system device drivers or system services.

The machine-readable storage medium 300 is shown having storage routine 302, which, when executed, manipulates units through various subroutines. The processes of subroutines under the storage routine 302, when executed are described above in regard to FIG. 4. A separate packets subroutine 304 is for sorting packets having data of interest. An attach time stamp subroutine 306 is for tagging the packets. A store packet subroutine 308 is to direct the appropriate packets into storage.

The machine-readable storage medium 300 also is depicted as having a play routine 310. The processes of various subroutines used for this play routine 310, which when executed, are described above with regard to FIG. 5. A compare time stamp subroutine 312 is for determining whether it is time for transfer of the packet. A delay subroutine 314 is to pause the preparation of a packet for transfer where it is not time for such transfer. A transfer data subroutine 316 is to transfer the data for receipt at a player device.

In addition, other software components may be included, such as an operating system 320.

The software components may be provided in as a series of computer readable instructions that may be embodied as data signals in a carrier wave. When the instructions are executed, they cause a processor to perform the processing and storing data steps as described. For example, the instructions may cause a processor to separate packets, attache time stamps, store packets, compare time stamps to ready times, etc. Such instructions may be presented to the processor by various mechanisms, such as a plug-in, static library, dynamic library, system device driver, system service, etc.

The present invention has been described above in varied detail by reference to particular embodiments and figures. However, these specifics should not be construed as limitations on the scope of the invention, but merely as illustrations of some of the presently preferred embodiments. It is to be further understood that other modifications or substitutions may be made to the described the broadcast processing system as well as methods of its use without departing from the broad scope of the invention. The above-described steps of processing and storing broadcast data may be performed in various orders. Therefore, the following claims and their legal equivalents should determine the scope of the invention.

What is claimed is:

1. A method of storing and playing a broadcast stream, the method comprising:
   receiving a stream of a plurality of packets for multiple channels;
   selecting channel packets and associated packets from the plurality of packets for a particular channel;
   tracking order and time of the selected channel and associated packets;
   separating the selected channel associated packets from the stream;
   attaching a time stamp to each of the separated channel packets;
   storing the channel packets and the associated packets;
   comparing the time stamp of each channel packet to a ready time; and
   if the time stamp of a channel packet equals the ready time, transferring channel data from the channel packet and associated data from an associated packet to a player device.

2. The method of claim 1, wherein the ready time comprises an appropriate time to transfer the channel data and the associated data.

3. The method of claim 1, wherein if the time stamp of the channel packet does not equal the ready time, determining remaining time for the time stamp to equal the ready time and pausing the transferring of the channel data and the associated data for the remaining time.

4. The method of claim 1, wherein the storing is performed by direct memory access.

5. The method of claim 1, further comprising retrieving the channel packet and the associated packet from storage prior to transferring the channel data and the associated data.

6. The method of claim 5, further comprising retrieving a descrambling key from the associated packet for the channel packet prior to transferring the channel data.

7. A broadcast processing system for storing and playing data, comprising:
   a demultiplexer to
   receive a stream of a plurality of packets for multiple channels,
   select channel packets and associated packets from the plurality of packets for a particular channel,
   track order and time of the selected channel and associated packets,
   separate the selected channel and associated packets from the stream;
   a time stamp unit to attach a time stamp to each of the separated channel packets;
   a packet storage unit to store the channel packets and the associated packets;
   a time comparator to compare the time stamp of each channel packet to a ready time; and
   a transfer interface to transfer channel data from a channel packet and associated data from an associated packet to a player device, if the time stamp of the channel packet equals the ready time.

8. The system of claim 7, wherein the ready time comprises an appropriate time to transfer the channel data and the associated data.

9. The system of claim 7, further comprising a direct memory access controller to directly access the packet storage unit to retrieve the channel packet and the associated packet from the packet storage unit prior to transferring the channel data and the associated data.

10. The system of claim 7, further comprising a descrambling unit to descramble a key from the associated packet for the channel packet prior to transferring the channel data.

11. A machine-readable medium having stored thereon data comprising sets of instructions which, when executed by a machine, cause the machine to:
    receive a stream of a plurality of packets for multiple channels;
    select channel packets and associated packets from the plurality of packets for a particular channel;
    track order and time of the selected channel and associated packets;
    separate the selected channel associated packets from the stream;
    attach a time stamp to each of the separated channel packets;
    store the channel packets and the associated packets;
    compare the time stamp of each channel packet to a ready time; and
    if the time stamp of a channel packet equals the ready time, transfer channel data from the channel packet and associated data from associated packet to a player device.

12. The machine-readable medium of claim 11, wherein the ready time comprises an appropriate time to transfer the channel data and the associated data.

13. The machine-readable medium of claim 11, wherein the sets of instructions which, when executed by the machine, further cause the machine to pause the transfer of the channel data and the associate data, if the time stamp of the channel packet does not equal the ready time.

14. The machine-readable medium of claim 13, wherein the sets of instructions which, when executed by the machine, further cause the machine to determine remaining time for the time stamp to equal the ready time.

15. The machine-readable medium of claim 11, wherein the sets of instructions which, when executed by the machine, further cause the machine to retrieve the channel packet and the associated packet from storage prior to transferring the channel data and the associated data.

* * * * *

UNITED STATES PATENT AND TRADEMARK OFFICE
CERTIFICATE OF CORRECTION

PATENT NO. : 6,981,274 B2 Page 1 of 1
APPLICATION NO. : 09/823826
DATED : December 27, 2005
INVENTOR(S) : Tripathy It is certified that error appears in the above-identified patent and that said Letters Patent is hereby corrected as shown below:

Column 11, at line 10, after "channel" insert --and--.

Signed and Sealed this

Fourth Day of December, 2007

JON W. DUDAS
*Director of the United States Patent and Trademark Office*